US012562672B2

(12) United States Patent
Teng et al.

(10) Patent No.: US 12,562,672 B2
(45) Date of Patent: Feb. 24, 2026

(54) SHUTTER

(71) Applicant: National Taiwan Normal University, Taipei (TW)

(72) Inventors: Tun-Chien Teng, Taipei (TW); Yu-Wei Huang, Taichung (TW)

(73) Assignee: National Taiwan Normal University, Taipei (TW)

( * ) Notice: Subject to any disclaimer, the term of this patent is extended or adjusted under 35 U.S.C. 154(b) by 299 days.

(21) Appl. No.: 18/212,835

(22) Filed: Jun. 22, 2023

(65) Prior Publication Data

US 2024/0305238 A1 Sep. 12, 2024

(30) Foreign Application Priority Data

Mar. 6, 2023 (TW) ................................. 112108030

(51) Int. Cl.
| | |
|---|---|
| *H02S 20/22* | (2014.01) |
| *F21V 8/00* | (2006.01) |
| *G02B 19/00* | (2006.01) |
| *G02B 26/08* | (2006.01) |
| *G02B 27/14* | (2006.01) |

(52) U.S. Cl.
CPC ............ *H02S 20/22* (2014.12); *G02B 6/0095* (2013.01); *G02B 19/0038* (2013.01); *G02B 26/0816* (2013.01); *G02B 27/142* (2013.01); *G02B 19/0042* (2013.01); *G02B 19/009* (2013.01)

(58) Field of Classification Search
CPC .... G02B 6/0095; G02B 6/0076; G02B 17/00; G02B 19/00; G02B 19/0038; G02B 19/0042; G02B 26/0816; G02B 27/142; H02S 20/22; H02S 20/32
See application file for complete search history.

(56) References Cited

U.S. PATENT DOCUMENTS

| | | | | |
|---|---|---|---|---|
| 5,002,379 | A * | 3/1991 | Murtha | F24S 23/80 |
| | | | | 359/853 |
| 8,184,372 | B1 * | 5/2012 | Gu | G02B 19/0033 |
| | | | | 359/597 |
| 2011/0203662 | A1 * | 8/2011 | Minano | G02B 17/002 |
| | | | | 359/641 |
| 2013/0250422 | A1 * | 9/2013 | Tandler | G02B 19/0019 |
| | | | | 359/597 |
| 2015/0070776 | A1 * | 3/2015 | Maxey | G02B 27/30 |
| | | | | 359/641 |
| 2018/0106442 | A1 * | 4/2018 | Gardiner | G02B 5/045 |
| 2018/0164561 | A1 * | 6/2018 | Kozodoy | G02B 19/0042 |

* cited by examiner

*Primary Examiner* — Uyen Chau N Le
*Assistant Examiner* — Darby M. Thomason

(57) ABSTRACT

A shutter includes a plurality of light-guiding devices each of which includes a light collector and a beam expander. The light collector includes a light-guiding plate that has a first end portion and a second end portion opposite to the first end portion in a first direction, and a plurality of light-collecting members that are disposed on the first end portion and that are arranged in the first direction. Each of the light-collecting members has a curved surface that is adapted for reflecting light beams that travel into the light-collecting member so that the light beams travel into the light-guiding plate. The beam expander is disposed on the second end portion of the light-guiding plate. When the light beams travel into the light-guiding plate, the light-guiding plate is adapted for the light beams to reflect therein, and to travel through the second end portion into the beam expander.

5 Claims, 9 Drawing Sheets

SHUTTER

CROSS-REFERENCE TO RELATED APPLICATION

This application claims priority to Taiwanese Invention Patent Application No. 112108030, filed on Mar. 6, 2023.

FIELD

The disclosure relates to a light-guiding device, and more particularly to a light-guiding device and a shutter having the light-guiding device.

BACKGROUND

Due to improvements in the standard of living and economic development, energy demand for lighting is expected to continue to experience growth in the future. Therefore, reducing consumption of non-renewable energy used on lighting has become a key to saving energy. Currently, one solution is to increase luminous efficiency of lighting devices, and another solution is to utilize solar power.

Nowadays, many daylighting techniques, such as tubular light guides, light-guiding optical fibers, outdoor light-reflecting boards, and sunroofs, are used in indoor lighting. However, because the angle of incidence of the sunlight varies with times of the day and the seasons, sunlight may not be guided into a room when the angle of incidence of the sunlight does not fall within a working range of a conventional fixed light-guiding device, and therefore the hours during which that the conventional fixed light-guiding device actually operates in a day is limited. Although a conventional fiber-optic light guide that cooperates with a conventional outdoor solar tracker may be used to resolve the problem of the varying angle of the incidence of the sunlight, cost of aligning the conventional outdoor solar tracker with the conventional fiber-optic light guide may be relatively high, and an outdoor solar tracker capable of precisely orienting itself toward the sun also consumes additional electrical energy.

SUMMARY

Therefore, an object of the disclosure is to provide a light-guiding device that can alleviate at least one of the drawbacks of the prior art.

According to the disclosure, the light-guiding device includes a light collector and a beam expander. The light collector includes a light-guiding plate and a plurality of light-collecting members. The light-guiding plate has a first end portion and a second end portion opposite to the first end portion in a first direction. The light-collecting members are disposed on the first end portion of the light-guiding plate and are arranged in the first direction. Each of the light-collecting members is elongated in a second direction perpendicular to the first direction, and has a curved surface that is adapted for reflecting light beams that travel into the light-collecting member and encounter the curved surface so that the light beams travel into the light-guiding plate. The beam expander is disposed on the second end portion of the light-guiding plate of the light collector. An area of a cross section of the beam expander orthogonal to the first direction increases as the beam expander extends away from the second end portion. When the light beams travel into the light-guiding plate, the light-guiding plate is adapted for the light beams to reflect therein, to be collected at the second end portion thereof, and to travel through the second end portion into the beam expander.

Another object of the disclosure is to provide a shutter that can alleviate at least one of the drawbacks of the prior art.

According to the disclosure, the shutter includes a window frame and a plurality of the light-guiding devices as mentioned above. Each of the light-guiding devices is pivotably mounted to the window frame.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
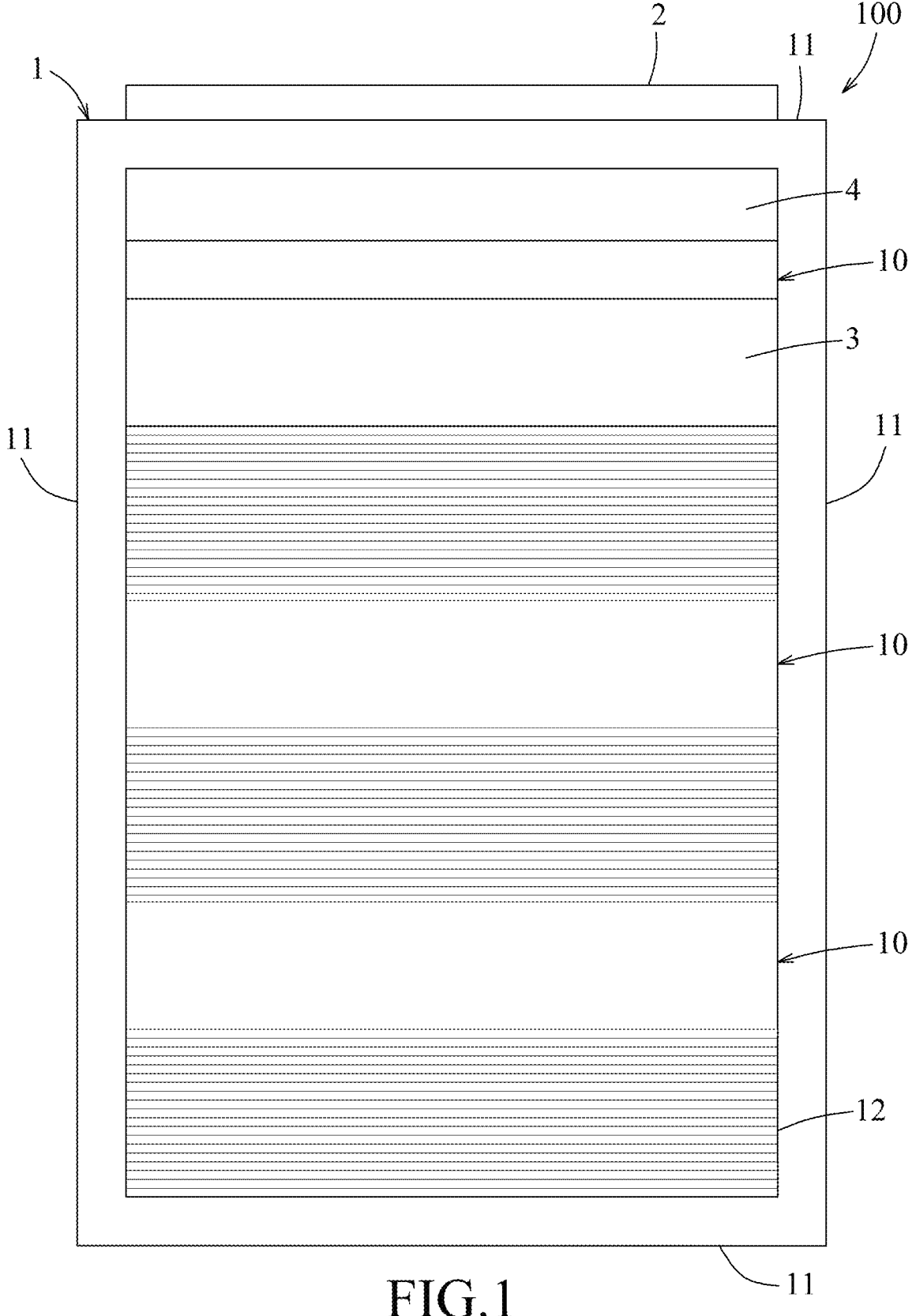
FIG. 1 is a front view of an embodiment of a shutter according to the disclosure, illustrating the shutter in a closed state and having a plurality of light-guiding devices.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
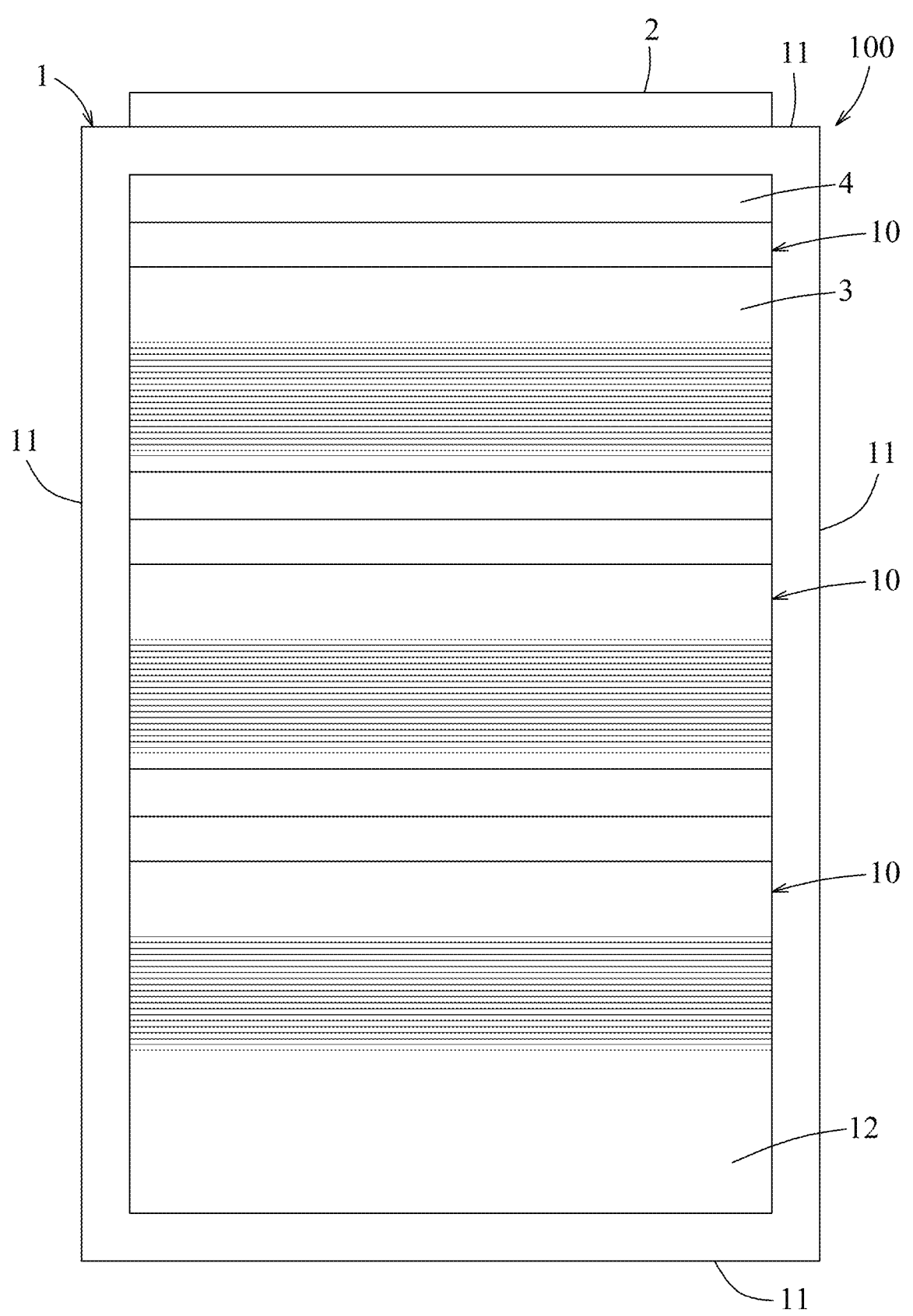
FIG. 2 is a view similar to FIG. 1, but illustrating the shutter in an open state.
Figure 3:
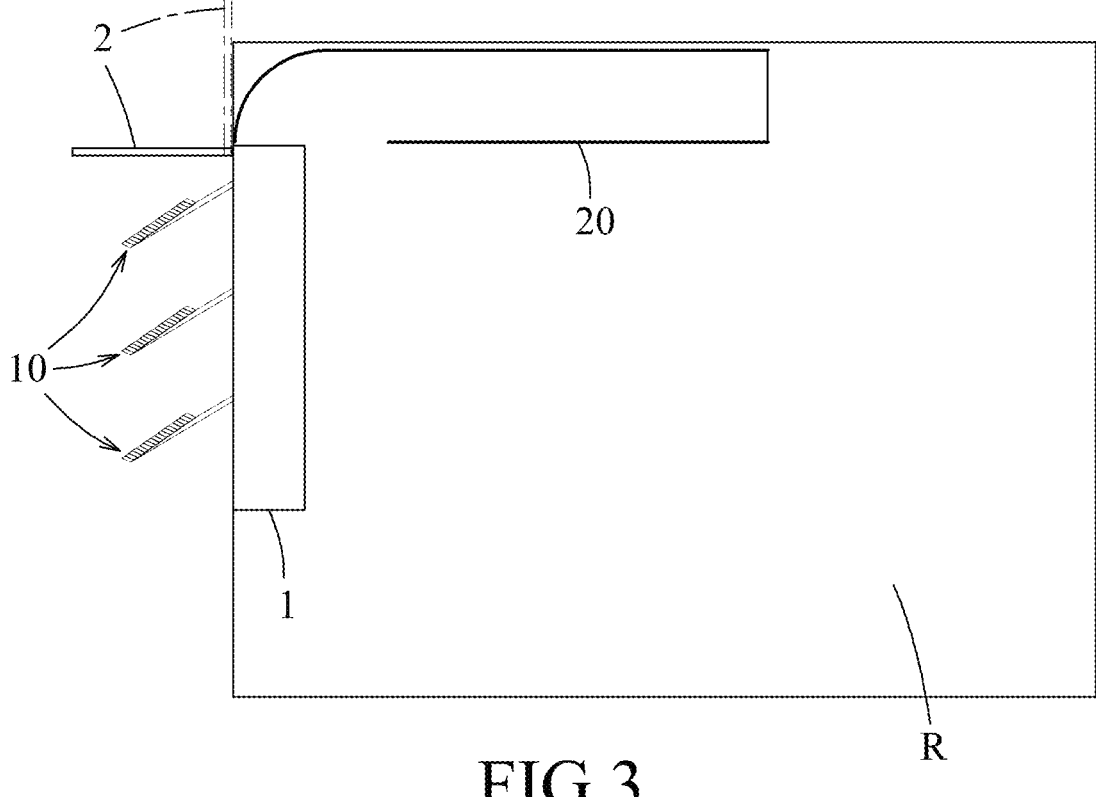
FIG. 3 is a schematic side view of the embodiment, illustrating the shutter and a tubular daylighting device disposed in a room and the shutter in the open state.
Figure 8:
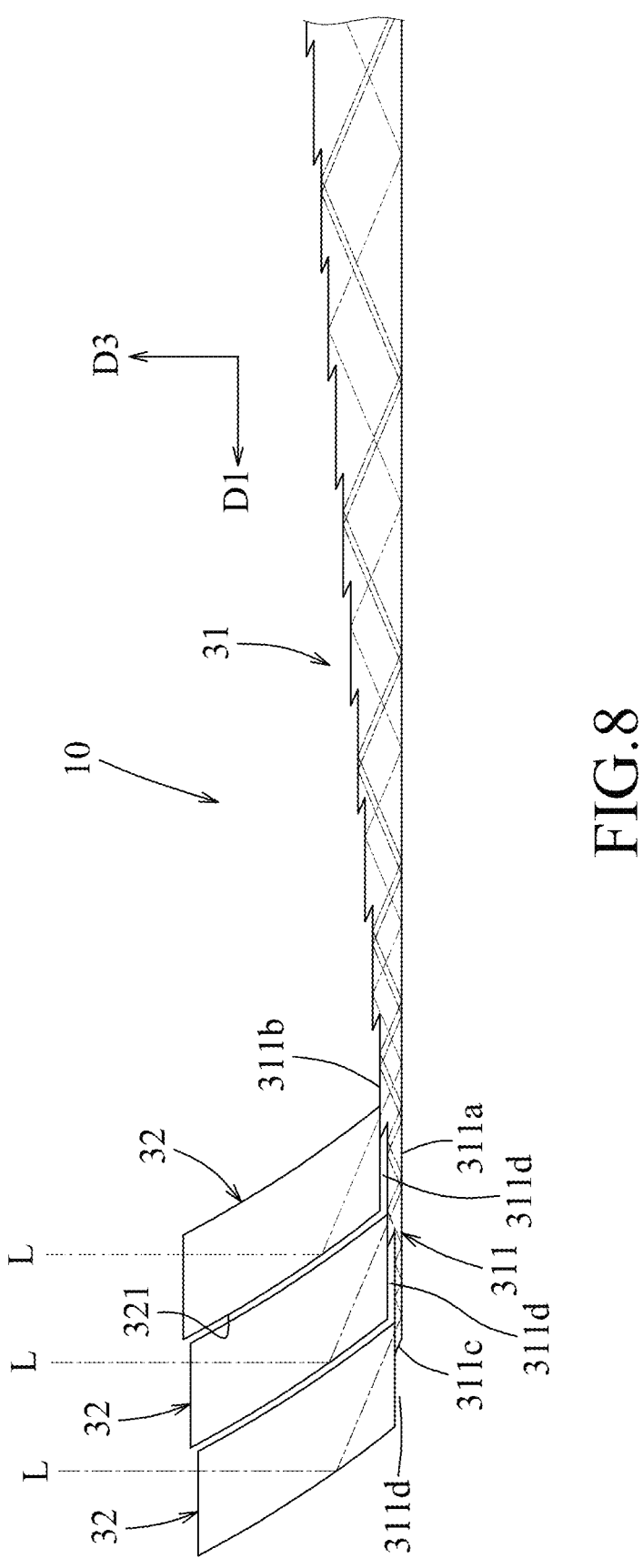
FIG. 8 is a view similar to FIG. 7 but illustrating representative light beams travelling in the light collector of the one of the light-guiding devices.

Referring to FIGS. 1 to 3, an embodiment of a shutter 100 according to the disclosure is adapted to be disposed in a room (R) and is adapted to cooperate with a tubular daylighting device 20 that is disposed on a ceiling of the room (R) to guide light beams (L) (see FIG. 8) into the room (R) so that uniformity of illumination in the room (R) may be improved. An inner wall of the tubular daylighting device 20 is made of a material that reflects light, and an end of the tubular daylighting device 20 is in a shape of a quarter circle. The tubular daylighting device 20 guides a portion of the light beams (L) deep into the room (R) so that the light beams (L) are not concentrated around the shutter 100. Another end of the tubular daylighting device 20 is provided with a light-diffusing plate that includes a plurality of micro-scale arc-shaped members (not shown) capable of diffusing the light beams (L) so that the uniformity of the illumination in the room (R) may be improved. The shutter 100 includes a window frame 1, a soffit board 2, and a plurality of light-guiding devices 10. Each of the light-guiding devices 10 is pivotally mounted to the window frame 1.

Figure 4:
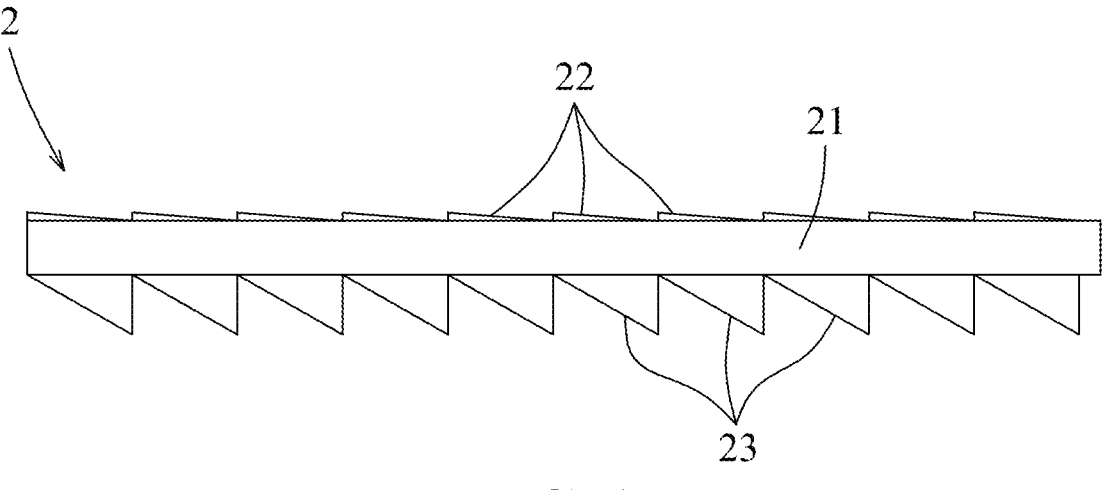
FIG. 4 is a schematic side view of a soffit board of the embodiment.

Referring further to FIG. 4, the window frame 1 is rectangular, substantially lies in an imaginary frame plane, and has four side portions 11 and an opening 12 that is defined by the side portions 11. The side portions 11 are respectively located at a top side, a bottom side, a left side, and a right side of the opening 12. The soffit board 2 is pivotally mounted to one of the side portions 11 that is located at the top side of the opening 12, is located above the light-guiding devices 10, and is pivotable between a service position (see the soffit board 2 depicted by solid lines in FIG. 3) and a storage position (see the soffit board 2 depicted by dashed broken lines in FIG. 3). When the soffit board 2 is in the service position, the soffit board 2 is oblique to the imaginary frame plane. When the soffit board 2 is in the storage position, the soffit board 2 is parallel to the imaginary frame plane. The soffit board 2 includes a board body 21, a plurality of first micro-scale optical members 22 that are disposed on one side of the board body 21, and a plurality of second micro-scale optical members 23 that are disposed on another side of the board body 21 opposite to the first micro-scale optical members 22. In this embodiment, each of the first micro-scale optical members 22 has a cross section that is configured to be a right triangle, and each of the second micro-scale optical members 23 has a cross section that is configured to be a right triangle. The first micro-scale optical members 22 respectively correspond in position to the second micro-scale optical members 23. A distance from a distal point of the right triangular cross section of each of the second micro-scale optical members 23 to the board body 21 is greater than a distance from a distal point of the right triangular cross section of each of the first micro-scale optical members 22 to the board body 21. In one embodiment, the distance from the distal point of the right triangular cross section of each of the second micro-scale optical members 23 to the board body 21 may be, but not limited to, smaller than the distance from the distal point of the right triangular cross section of each of the first micro-scale optical members 22 to the board body 21. In another embodiment, each of the first micro-scale optical members 22 and the second micro-scale optical members 23 may have a cross section that is not a right triangle, and the first micro-scale optical members 22 may not respectively correspond in position to the second micro-scale optical members 23.

The light-guiding devices 10 are located at the opening 12, and are arranged in an up-down direction. Each of the light-guiding devices 10 is pivotally mounted between two of the side portions 11 of the window frame 1 that are respectively located at the left and right sides of the opening 12, and serves as a slat. Referring to FIGS. 1 to 3 again, the shutter 100 is convertible between a closed state (see FIG. 1) and an open state (see FIGS. 2 and 3). When the shutter 100 is in the closed state, the light-guiding devices 10 lie in the imaginary frame plane such that the light-guiding devices 10 cooperatively close the opening 12 and refrain air from flowing through the opening 12. The shutter 100 is then converted into the open state when the light-guiding devices 10 are pivoted relative to the frame 1. When the shutter 100 is in the open state, each of the light-guiding devices 10 is oblique to the imaginary frame plane such that the opening 12 is not closed and that the air may flow through the opening 12.

Referring to FIGS. 5 to 8, each of the light-guiding devices 10 may be made of, for example, a light-transmitting material. The light-transmitting material may be, for example, polymethyl methacrylate (i.e., PMMA) that has a refractive index of 1.5. Each of the light-guiding devices 10 includes a light collector 3, a beam expander 4, and a photovoltaic member 5. The light collector 3 of each of the light-guiding devices 10 includes a light-guiding plate 31 that has a first end portion 311 and a second end portion 312 opposite to the first end portion 311 in a first direction (D1), and eighteen light-collecting members 32 that are disposed on the first end portion 311 of the light-guiding plate 31 and that are arranged in the first direction (D1). The first end portion 311 of each of the light-guiding devices 10 is step-shaped, and has a first surface 311a, eighteen second surfaces 311b that are located at one side of the first surface 311a, that are arranged in the first direction (D1), and that are spaced apart from each other in the first direction (D1), and eighteen riser surfaces 311c that are arranged in the first direction (D1) and that are spaced apart from each other in the first direction (D1). For each of the light-guiding devices 10, each of the second surfaces 311b is elongated in a second direction (D2) perpendicular to the first direction (D1), and the second surfaces 311b are spaced apart from each other in a third direction (D3) perpendicular to the first and second directions (D1, D2). In this embodiment, for each light-guiding device 10, a distance between the first surface 311a and one of any two adjacent ones of the second surfaces 311b that is proximate to the second end portion 312 is greater than a distance between the first surface 311a and the other one of any two adjacent ones of the second surfaces 311b that is distal from the second end portion 312. For each of the light-guiding devices 10, one of the riser surfaces 311c that is the farthest from the second end portion 312 interconnects the first surface 311a and one of the second surfaces 311b that is the farthest from the second end portion 312, and each of the remaining seventeen riser surfaces 311c interconnects two adjacent ones of the second surfaces 311b. Each of the riser surfaces 311c is oblique to the first direction (D1).

For each of the light-guiding devices 10, the light-collecting members 32 are respectively disposed on the second surfaces 311b of the first end portion 311 of the light-guiding plate 31, and each of the light-collecting members 32 is elongated in the second direction (D2), and has a curved surface 321 that is spaced apart from the respective one of the second surfaces 311b, that is paraboloidal, that opens toward the second end portion 312, and that is adapted for completely reflecting the light beams (L) which travel into the light-collecting member 32 and encounter the curved surface 321 so that the light beams (L) travel into the light-guiding plate 31. For each of the light-guiding devices 10, when the light beams (L) travel into the light-guiding plate 31, the light-guiding plate 31 is adapted for the light beams (L) to reflect therein, to be collected at the second end portion 312 thereof, and to travel through the second end portion 312 into the beam expander 4. It is noted that, in one embodiment, the number of the second surfaces 311b, the number of the riser surfaces 311c, and the number of the light-collecting members 32 may not be limited to eighteen, as long as each of the numbers is greater than one.

For each of the light-guiding devices 10, each of the light-collecting members 32 cooperates with a respective one of the riser surfaces 311c of the first end portion 311 of the light-guiding plate 31 to define an external medium space 311d that prevents the light beams (L) from exiting the first end portion 311 so that total internal reflection may occur within the light-guiding plate 31 and that a total amount of the light beams (L) which travel into the light-guiding plate 31 may be collected at the second end portion 312. Referring to FIGS. 7 and 8 again, taking one of the light-guiding devices 10, three of the light-collecting members 32 of the one of the light-guiding devices 10 that are the farthest from the second end portion 312 of the light-guiding device 10, and three representative light beams (L) for example, when the leftmost light beam (L) travels in the light-guiding plate 31 and encounters a boundary between the light-guiding plate 31 and the middle external medium space 311d, the leftmost light beam (L) is not refracted into the middle external medium space 311d such that the leftmost light beam (L) is completely reflected back into the light-guiding plate 31. When the middle light beam (L) travels in the light-guiding plate 31 and encounters a boundary between the light-guiding plate 31 and the rightmost external medium space 311d, the leftmost light beam (L) is not refracted into the rightmost external medium space 311d such that the middle light beam (L) is completely reflected back into the light-guiding plate 31. Consequently, for each of the light-guiding devices 10, the total internal reflection occurs within the light-guiding plate 31, and the light beams (L) that travel into the light-guiding plate 31 are prevented from exiting the light-guiding plate 31 before traveling through the second end portion 312 into the beam expander 4.

Figure 5:
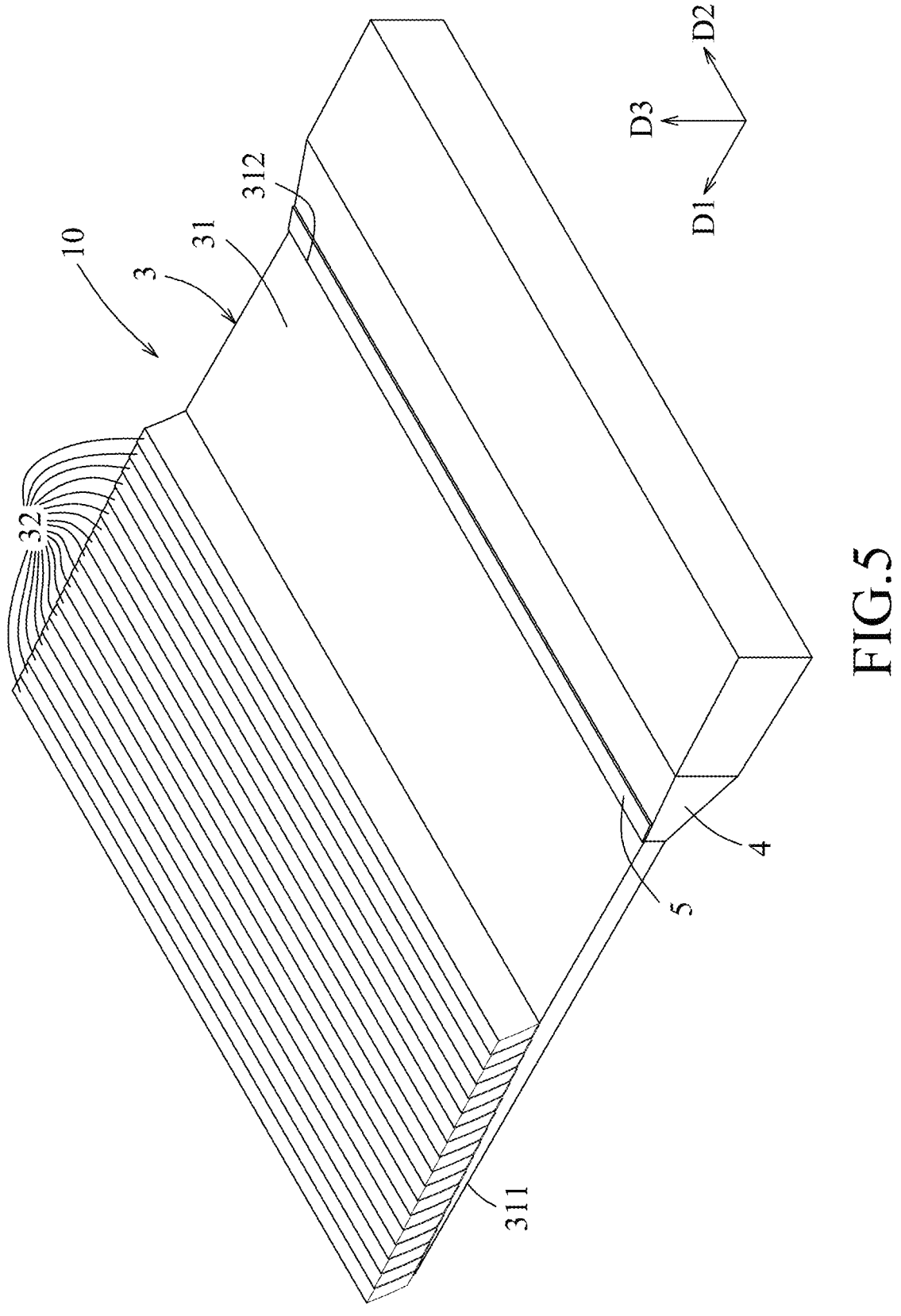
FIG. 5 is a perspective view of one of the light-guiding devices.
Figure 6:
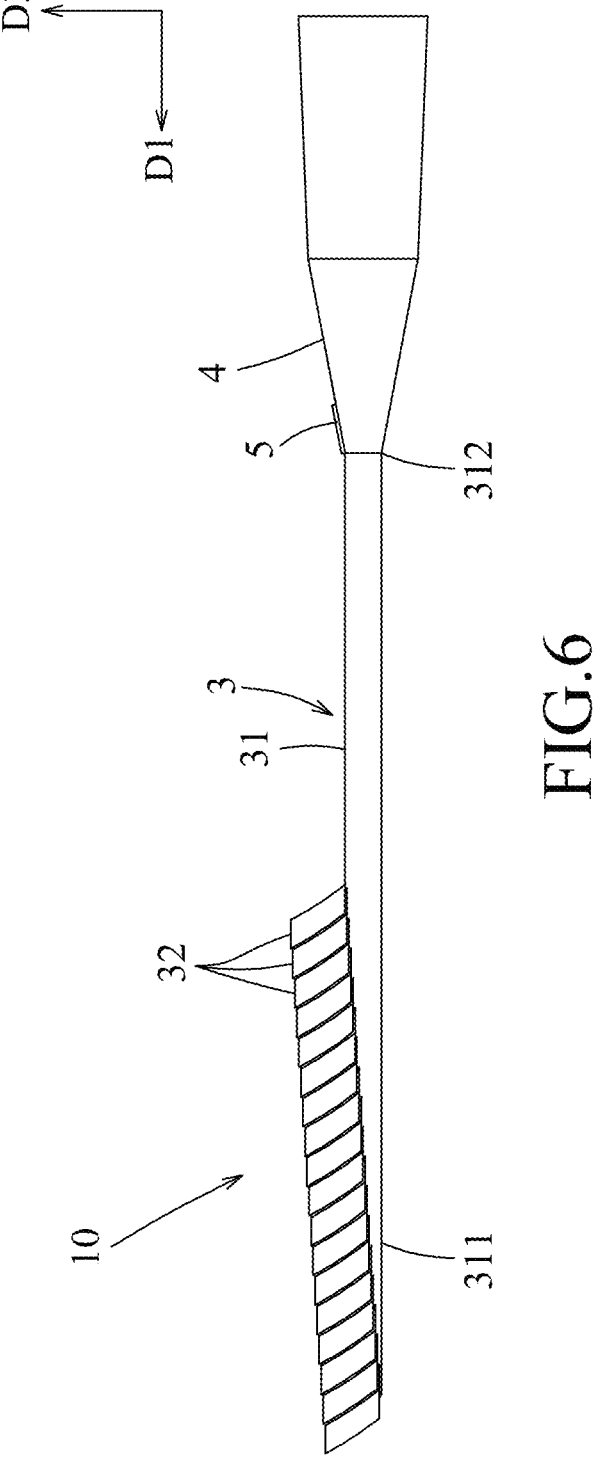
FIG. 6 is a side view of the one of the light-guiding devices.
Figure 7:
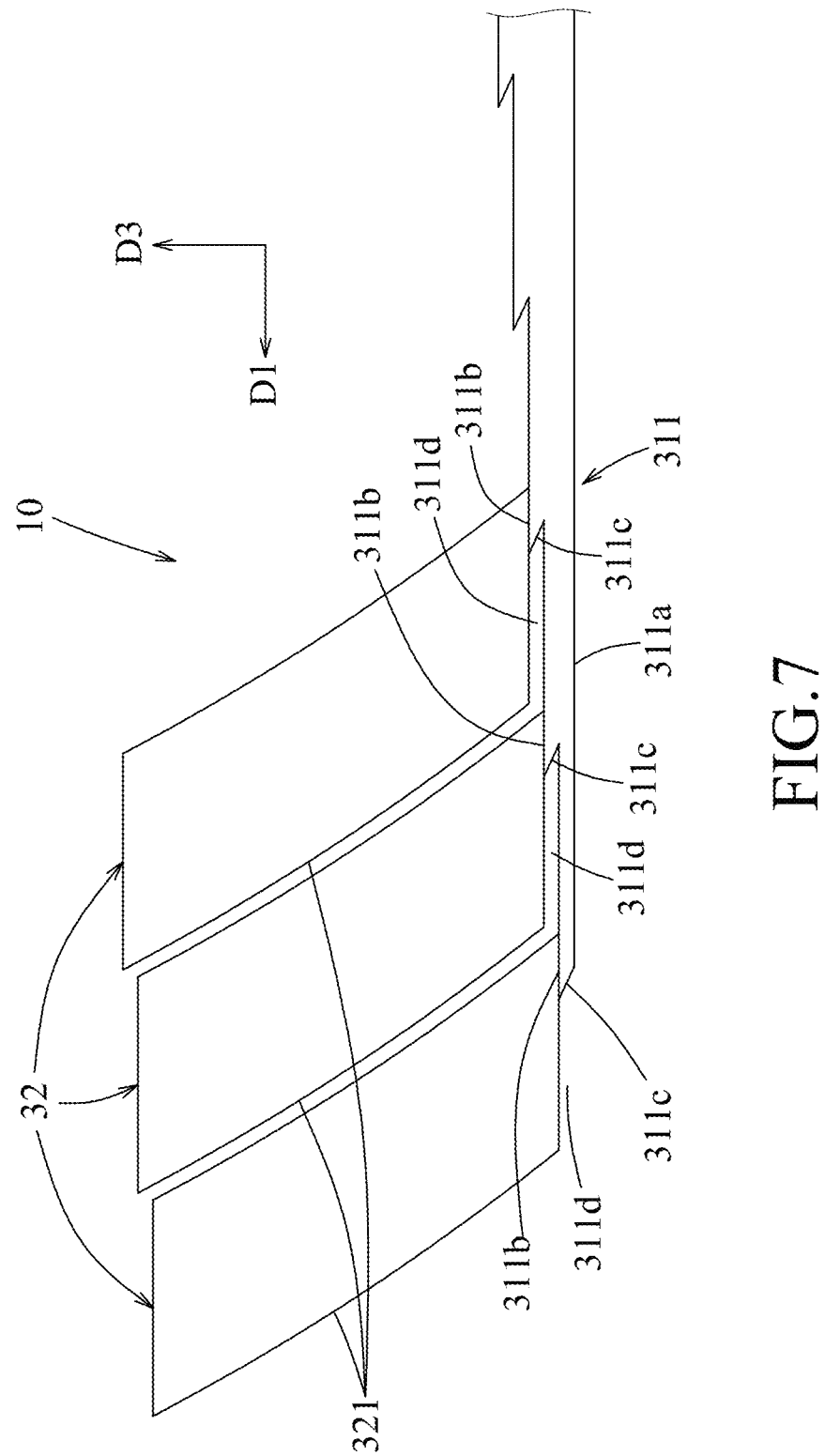
FIG. 7 is a fragmentary, schematic side view of a first end portion of a light-guiding plate of a light collector of the one of the light-guiding devices and light-collecting members of the light collector.
Figure 9:
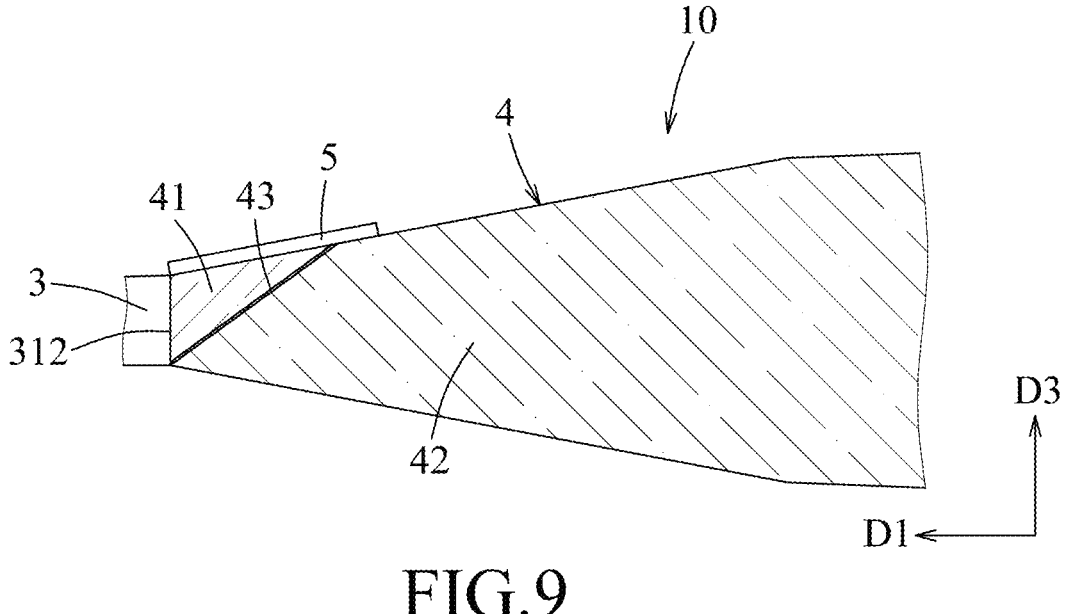
FIG. 9 is a fragmentary side view of a beam expander and a photovoltaic member of the one of the light-guiding devices.
Figure 10:
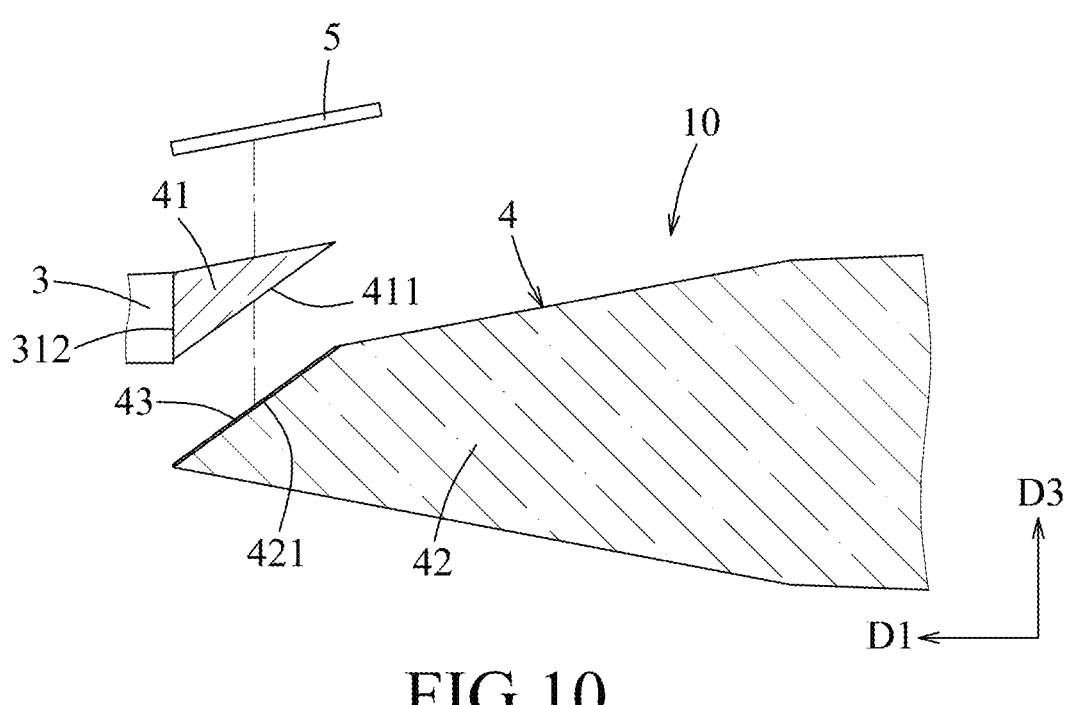
FIG. 10 is a fragmentary, exploded side view of the beam expander and the photovoltaic member of the one of the light-guiding devices.

Referring further to FIGS. 9 and 10, in cooperation with FIG. 5, for each of the light-guiding devices 10, the beam expander 4 is disposed on the second end portion 312 of the light-guiding plate 31 of the light collector 3. Each of the beam expander 4 is a compound parabolic light collector. An area of a cross section of the beam expander 4 of each of the light-guiding devices 10 orthogonal to the first direction (D1) increases as the beam expander 4 of the light-guiding device 10 extends away from the second end portion 312 of the light-guiding device 10. In this embodiment, for each light-guiding device 10, the beam expander 4 gradually widens in the second direction (D2) and thickens in the third direction (D3) while extending away from the second end portion 312. The beam expander 4 of each of the light-guiding devices 10 includes a light-incident portion 41 that is connected to the second end portion 312 of the light-guiding plate 31 of the light-guiding device 10, a light-emergent portion 42 that is connected to the light-incident portion 41, and a beam-splitting layer 43 that is disposed between the light-incident portion 41 and the light-emergent portion 42. The light-incident portion 41 of each of the light-guiding devices 10 has a connecting surface 411 that is oblique to the first direction (D1). The light-emergent portion 42 of each of the light-guiding devices 10 has a connecting surface 421 that faces the connecting surface 411 of the light-incident portion 41 of the light-guiding device 10, and that is oblique to the first direction (D1). In this embodiment, for each of the beam expanders 4, the connecting surface 411 is aligned with the connecting surface 421. The beam-splitting layer 43 of each of the light-guiding devices 10 is disposed between the connecting surface 411 and the connecting surface 421 of the light-guiding device 10. The photovoltaic member 5 of each of the light-guiding devices 10 is disposed on the light-incident portion 41 of the beam expander 4 of the light-guiding device 10. The light-incident portion 41 of each of the light-guiding devices 10 is located between the beam-splitting layer 43 and the photovoltaic member 5 of the light-guiding device 10. Each of the photovoltaic members 5 may be, for example, a solar panel or a solar cell. The beam-splitting layer 43 of each of the light-guiding devices 10 is a reflective film that selectively transmits light of different wavelengths so that visible light is allowed to pass therethrough and that infrared light is reflected and travels to the photovoltaic member 5 of the light-guiding device 10 for power generation. Therefore, the shutter 100 may be more energy-efficient.

For production of each of the beam expanders 4, an object is cut into two pieces that respectively serve as the light-incident portion 41 and the light-emergent portion 42, and then a wavelength selective reflective film is disposed on one of the connecting surface 411 and the connecting surface 421 via electroplating process to serve as the beam-splitting layer 43. Afterwards, the light-incident portion 41 and the light-emergent portion 42 are glued together by, for example, one of optically clear adhesive, UV adhesive, and polyvinyl acetate glue. In this embodiment, for each of the light-guiding devices 10, the beam-splitting layer 43 is oblique to an imaginary plane normal to the third direction (D3), and an angle between a normal vector of the beam-splitting layer 43 and the third direction (D3) may be, but not limited to, 36 degrees. For each of the light-guiding devices 10, according to paths of the light beams (L) that travel into the beam expander 4 and a shape of the beam expander 4, the angle between the normal vector of the beam-splitting layer 43 and the third direction (D3) may be adjusted so that a greater amount of the infrared light may be reflected and may travel to the photovoltaic member 5, and that an area of the photovoltaic member 5 may be minimized.

Figure 11:
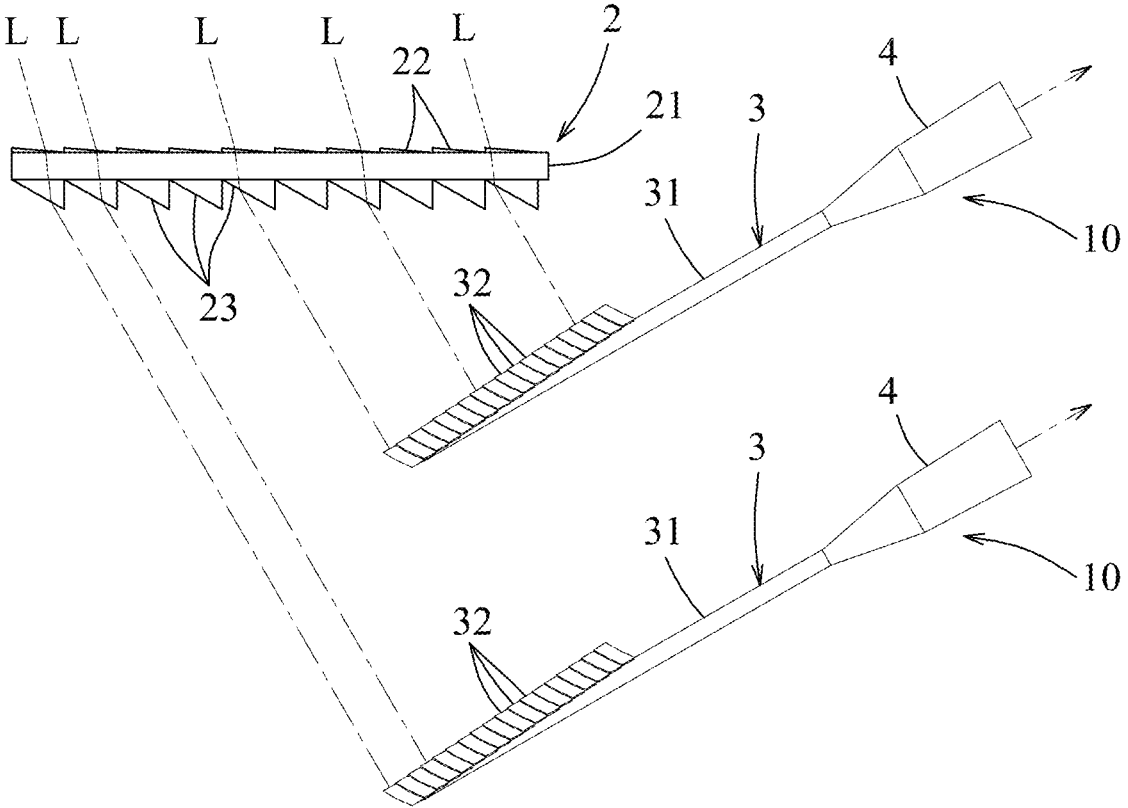
FIG. 11 is a schematic side view, illustrating representative light beams travelling through the soffit board and two of the light-guiding devices.

Referring further to FIG. 11, in cooperation with FIGS. 2 and 3, when there is sunlight, a user may convert the shutter 100 into the open state by urging the light-guiding devices 10 to pivot. At this time, the light beams (L) travel into the light-collecting members 32 of the light-guiding devices 10 and reflect off the curved surfaces 321. Then, the light beams (L) travel into the light-guiding plates 31, are reflected inside the light-guiding plates 31, are collected at the second end portions 312, and travel through the second end portions 312 into the beam expanders 4. Afterwards, a portion of the light beams (L) that is categorized as the visible light travels through the beam-splitting layers 43 and is guided to travel toward the ceiling of the room (R) so that the tubular daylighting device 20 may guide the portion of the light beams (L) deep into the room (R). Consequently, the light beams (L) are not concentrated around the shutter 100 and the uniformity of the illumination in the room (R) may be improved. When a solar altitude angle is greater, the light beams (L) guided by the light-guiding devices 10 may travel into the room (R) horizontally, thereby causing energy waste and glare that makes people in the room (R) uncomfortable. At this time, the soffit board 2 may be pivoted to the service position. By virtue of the first and second micro-scale optical members 22, 23, even if the solar altitude angle is relatively great, the light beams (L) may be redirected so that the light beams (L) travel in paths as if the light beams (L) are shone by the sun with smaller solar altitude angle into the light collectors 3. Therefore, the light beams (L) may be guided to the ceiling of the room (R). That is to say, the soffit board 2 is typically used during the summer because the solar altitude angle is greater in the summer than in the winter.

In summary, for each of the light-guiding devices 10, by virtue of the total internal reflection occurring within the light-guiding plate 31, by virtue of the beam expander 4 disposed on the second end portion 312, and by virtue of the cross section of the beam expander 4 increasing while extending away from the second end portion 312, the light beams (L) that travel into the light-guiding plate 31 may be ensured to be transmitted from the beam expander 4. By virtue of each of the light-guiding devices 10 being pivotable and serving as the slat, the shutter 100 may guide the light beams (L) toward the ceiling of the room (R) at any time as long as there is sunlight, the light beams (L) may be prevented from concentrating around the shutter 100, and the uniformity of the illumination in the room (R) may be improved. In addition, by virtue of each of the light-guiding devices 10 being made of the light-transmitting material, the shutter 100 may not block the user's view as a conventional shutter does. Thus, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A shutter comprising:
    a window frame; and
    a plurality of light-guiding devices, each of said light-guiding devices being pivotably mounted to said window frame, and including
    a light collector that includes
        a light-guiding plate having a first end portion and a second end portion opposite to said first end portion in a first direction, and
        a plurality of light-collecting members disposed on said first end portion of said light-guiding plate and arranged in the first direction, each of said light-collecting members being elongated in a second direction perpendicular to the first direction, and having a curved surface that is adapted for reflecting light beams that travel into said light-collecting member and encounter said curved surface so that the light beams travel into said light-guiding plate, and
    a beam expander that is disposed on said second end portion of said light-guiding plate of said light collector, an area of a cross section of said beam expander orthogonal to the first direction increasing as said beam expander extends away from said second end portion, when the light beams travel into said light-guiding plate, said light-guiding plate being adapted for the light beams to reflect therein, to be collected at said second end portion thereof, and to travel through said second end portion into said beam expander;
    wherein said window frame is rectangular, substantially lies in an imaginary frame plane, and has four side portions, said shutter further comprising a soffit board that is pivotably mounted to one of said side portions and that is located above said light-guiding devices, said soffit board being pivotable between a service position, in which said soffit board is oblique to the imaginary frame plane, and a storage position, in which said soffit board is parallel to the imaginary frame plane; and
    wherein said soffit board includes a board body, a plurality of first micro-scale optical members that are disposed on one side of said board body, and a plurality of second micro-scale optical members that are disposed on another side of said board body opposite to said first micro-scale optical members.

2. The shutter as claimed in claim 1, wherein each of said first micro-scale optical members has a cross section that is configured to be a right triangle, each of said second micro-scale optical members having a cross section that is configured to be a right triangle, a distance from a distal point of said right triangular cross section of each of said second micro-scale optical members to said board body being greater than a distance from a distal point of said right triangular cross section of each of said first micro-scale optical members to said board body.

3. The shutter as claimed in claim 1, wherein said beam expander of each of said light-guiding devices includes a light-incident portion that is connected to said second end portion of said light-guiding plate of said light-guiding device, a light-emergent portion that is connected to said light-incident portion, and a beam-splitting layer that is disposed between said light-incident portion and said light-emergent portion.

4. The shutter as claimed in claim 3, wherein said light-incident portion of each of said light-guiding devices has a connecting surface that is oblique to the first direction, said light-emergent portion of each of said light-guiding devices having a connecting surface that faces said connecting surface of said light-incident portion of said light-guiding device and that is oblique to the first direction, said beam-splitting layer of each of said light-guiding devices being disposed between said connecting surface of said light-incident portion and said connecting surface of said light-emergent portion of said light-guiding device.

5. The shutter as claimed in claim 3, wherein each of said light-guiding devices further includes a photovoltaic member that is disposed on said light-incident portion of said beam expander thereof, said light-incident portion of each of said light-guiding devices being located between said beam-splitting layer and said photovoltaic member of said light-guiding device.

* * * * *